United States Patent [19]

Yang et al.

[11] 4,196,350

[45] Apr. 1, 1980

[54] APPARATUS FOR PHOTOCONTROLLED ION-FLOW ELECTRON RADIOGRAPHY

[75] Inventors: Kei-Hsiung Yang, Schenectady, N.Y.

[73] Assignee: General Electric Company, Schenectady, N.Y.

[21] Appl. No.: 203

[22] Filed: Jan. 2, 1979

[51] Int. Cl.[2] .......... G03B 41/16

[52] U.S. Cl. .......... 250/315.2

[58] Field of Search .......... 250/315 A, 315 R

[56] References Cited

U.S. PATENT DOCUMENTS

| | | | |
|---|---|---|---|
| 4,064,439 | 12/1977 | Yang | 250/315 A |
| 4,117,365 | 9/1978 | Yang | 250/315 A |
| 4,129,779 | 12/1978 | Kingsley | 250/315 A |
| 4,147,948 | 4/1979 | Yang | 250/315 A |

*Primary Examiner*—Craig E. Church
*Attorney, Agent, or Firm*—Geoffrey H. Krauss; James C. Davis; Marvin Snyder

[57] ABSTRACT

Improved apparatus for photocontrolled ion-flow electron radiography utilizes a selectively movable bonded phosphor plaque to allow removal of corona discharge means, utilized to precharge the selenium mesh before X-ray exposure, while increasing the quantum efficiency of the photoconductor.

8 Claims, 2 Drawing Figures

APPARATUS FOR PHOTOCONTROLLED ION-FLOW ELECTRON RADIOGRAPHY

BACKGROUND OF THE INVENTION

The present invention relates to x-ray imaging radiography and, more particularly, to improved apparatus for photocontrolled ion-flow electron radiography.

Xero radiography systems are replacing conventional screen-film x-ray imaging systems. One xeroradiographic apparatus for the electrostatic recording of x-ray imaging is disclosed and claimed in U.S. Pat. No. 3,940,620, issued Feb. 24, 1976 and assigned to the assignee of the present invention. Other electrostatic x-ray imaging apparatus is disclosed and claimed in U.S. Pat. No. 4,064,439, entitled "Photocontrolled Ion-Flow Electron Radiography", issued Dec. 20, 1977 and assigned to the assignee of the present invention. The methods and apparatus disclosed in the latter patent, incorporated herein by reference in its entirety, utilizes a first electrode, supporting a insulative material sheet upon a surface opposite that surface receiving x-radiation differentially absorbed by an object to be analyzed, and a second electrode positioned spaced from and parallel to the first electrode with a conductive mesh supporting a layer of photoconductive material upon the solid portions thereof. The photoconductive material is precharged with charge of a given polarity by means of a corona charging means and a plaque of phosphor material, capable of converting the x-radiation to optical photons, is moved into position adjacent the pre-charged photoconductive layer. The differentially-absorbed x-rays discharge the mesh-formed volumes of photoconductor to leave "islands" of charge. Ions, of the same polarity as originally precharged into the photoconductor, are then projected through the mesh interstices toward the insulative film on the first electrode to deposit a charge image thereon controlled by the "islands" of charge remaining on the photoconductive layer after x-ray exposure and removal of the phosphor plaque. The ion-flow projection, producing the charge image for subsequent xerographic development, can continue over the entire period of time during which the photoconductor retains the charge image formed thereon, whereby relatively high contrast imaging is achieved. However, greatest benefit, particularly when utilized for medical diagnostic purposes, is achieved by simplification of the apparatus and reduction of cost thereof. It is desirable to both remove the corona generating means for precharging the photoconductive mesh, prior to x-ray exposure, and to increase the photon quantum efficiency of the photoconductor, to provide more effective control of the ion flow and further improve contrast of the resulting image.

BRIEF SUMMARY OF THE INVENTION

In accordance with the invention, improved apparatus for photocontrolled ion-flow electron radiography, utilizes apparatus of the type having a first electrode supporting a sheet of insulating material upon a surface thereof opposite the surface receiving differentially-absorbed x-ray photons and a second electrode having a conductive mesh, supporting a layer of a photoncuctive insulator material fabricated on a surface of the mesh facing the first electrode and spaced therefrom; a plaque, formed of a phosphor material converting the x-ray photons to light photons of wavelength selected to differentially deplete the charge in each of a plurality of regions of photoconductor layer, is moved selectively into and out of abutment with the photoconductive layer. The plaque contains improvements characterized by a film of an insulative material formed upon that surface of the plaque adjacent to the photoconductive material and having a film of a transparent conductive material interposed between the insulative film and the phosphor layer. A potential source is connected between the transparent, conductive film of the bonded phosphor plaque and the conductive mesh, to provide an electric field through the photoconductive material of magnitude and direction sufficient to remove charges, of charge (electron-hole) pairs formed in the photoconductor responsive to x-ray induced light photons from the phosphor, to ground via the conductive mesh, whereby corona pre-charging means are no longer required. The electric field is present in the photoconductor during x-ray exposure and is of sufficient strength to increase the light quantum efficiency of the photoconductor to provide more efficient control of ion flow and improve the image contrast.

In one preferred embodiment, the phosphor portion of the bonded plaque has a thickness from about 3 to about 10 milli-inches and is supported on the surface thereof closest to the first electrode by a substantially x-ray transparent plate of bakelite or aluminum. The conductive film, transparent to the radiation emitted by the phosphor, is formed of indium oxide ($In_2O_3$) or tin oxide ($SnO_2$) having a thickness on the order of 1000 Angstroms, or tungsten having a thickness on the order of 200 Angstroms, and the insulating film has a thickness of between about 1 and about 10 microns. A potential source of magnitude between about 20 and about 200 volts is sufficient to product and electric field in a selenium photoconductor (of about 20 microns thickness), on the order of $10^4$–$10^5$ volts per centimeter.

Accordingly, it is one object of the present invention to provide improved apparatus for photocontrolled ion-flow electron radiography.

This and other objects of the present invention will become apparent upon consideration of the following detailed description and the accompanying drawings. dr

DETAILED DESCRIPTION OF THE INVENTION

Figure 1:
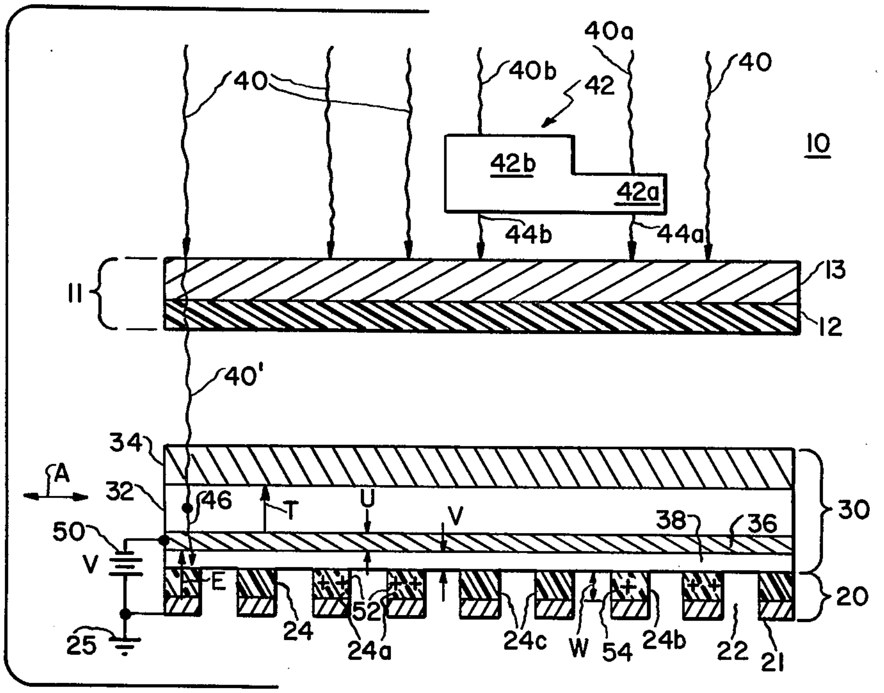
FIG. 1 is a sectional side view of improved apparatus in accordance with the principles of the present invenition, and illustrating the x-ray exposure of an object to be analyzed.

Referring now to the figures, apparatus 10 includes a first electrode 11 including a sheet 12 of an insulating material supported by a substantially planar conductive member 13 of a material substantially transparent to x-radiation. The insulating material sheet 12 is disposed in manner so as to be easily removable from conductive member 13. A second electrode 20 is spaced from, and substantially parallel to, first electrode 11, and includes a conductive screen mesh 21 having a two-dimensional array of microscopic apertures 22 therethrough with a layer 24 of a photoconductive insulating material, such as selenium, cadmium sulphide, zinc oxide, an organic compound and the like, fabricated essentially only upon the side of solid portion of mesh 21 closest to first electrode 11. Conductive mesh 21 is connected to electrical ground 25. Prior to exposure to x-radiation, the second electrode, and especially the photoconductive layer 24 thereof, is placed in a darkened environment, to insure the high resistivity of the photoconductive material.

A plaque 30 is formed of a layer 32 of a phosphor material characterized by emission of light photons in response to absorption of x-ray photons therein. The phosphor layer has a thickness T in the range of about 3 to about 10 milli-inches. The phosphor layer is supported by a backing plate 34 formed of a material, such a bakelite or aluminum and the like, which is substantially transparent to x-ray photons, and positioned in abutment with that surface of phosphor layer 32 closest to first electrode 11. A layer 36 of a conductive material, substantially transparent to the optical photons emitted by phosphor layer 32, is fabricated upon that surface of phosphor layer 32 furthest from first electrode 11. In a preferred embodiment, layer 36 is fabricated either of evaporated indium oxide ($In_2O_3$) or tin oxide ($S_nO_2$) with a thickness U of about 1000 Å, or of tungsten film with a thickness U of about 200 Å. A film 38 of an insulative material, transparent to the optical photons emitted from phosphor layer 32, is fabricated to a thickness V on the order of about 1 to about 10 microns, upon that surface of transparent conductive film 36 furthest from the phosphor layer. The entire bonded phosphor plaque 30 is mechanically supported (by means not shown for purposes of simplicity) for movement at least into and out of abutment with the top surface of the photoconductive layer 24 of second electrode 20, in the direction shown by arrows A.

A multiplicity of x-ray photons 40 are directed from a source (not shown) and essentially normal to the plane of first electrode 11. An object 42, to be analyzed, differentially absorbs the x-ray photons in accordance with the density of, and the path length through, each section of the object; the x-rays 40 passing outside the boundary of the object impinge upon first electrode 11 in relatively unabsorbed manner, while a relatively thin section 42*a* of the object absorbs relatively less of the x-ray photons 44*a* passing therethrough, with respect to the absorption of the x-ray photons 44*b* passing through a relatively thicker portion 42*b* of the object, assuming equal x-ray absorption density in both object portions 42*a* and 42*b*. The differentially-absorbed x-rays are transmitted through the light metal layer and plastic film of first electrode 11 and continue, as, e.g. x-ray photon 40', through the backing plate 34 of the phosphor plaque, which has previously been moved into position in abutment atop the surface of second electrode 20 facing the first electrode. X-ray quanta 40' are absorbed by phosphor layer 32 and converted into a plurality of photons of ultraviolet or visible radiation, in accordance with the photon conversion efficiency of the phosphor. As previously mentioned, the phosphor material of layer 32 is chosen to cause optical photons 46 to be emitted with wavelength chosen for absorption by the photoconductive material, which in a preferred embodiment is selenium. Immediately prior to x-ray exposure, a potential source 50 of magnitude V, is coupled between conductive transparent film 36, of plaque 30, and conductive mesh 21 of second electrode 20. The polarity of potential source 50 is chosen to make, in this preferred embodiment, conductive film 36 negative with respect to the grounded conductive mesh 21, and to produce an electric field E from the mesh 21, through the overlying volume of photoconductor 24 and insulative film 38, to conductive film 36, of magnitude on the order of about $10^4$ to about $10^5$ volts per centimeter. In the preferred embodiment, wherein the photoconductive layer 24 has a thickness W on the order of about 20 microns, the voltage magnitude V of potential source 50 is selected to be between about 20 volts and about 200 volts, respectively, to produce electric fields E between about $10^4$ volts per centimeter and about $10^5$ volts per centimeter, respectively.

A substantial portion of the optical photons 46, emitted responsive to x-ray quanta 40' impinging upon phosphor layer 32, pass through transparent electrode 36 and transparent insulator 38 and are absorbed by the photoconductive material, creating electron-hole pairs in the photoconductive material. The oppositely-charged electrons and holes drift in opposite directions, under the influence of electric field E, in the photoconductive layer. In the embodiment illustrated, the electrons drift in a direction opposite to the electric field direction and are conducted to ground 25 via conductive mesh 21; the positively-charged holes drift, in the direction of electric field E, to the surface of each photoconductor "island" adjacent to plaque 30. The presence of insulative film 38 prevents further drift of the holes into plaque 30. Thus, after x-ray exposure, a charge image is created on the surface of the photoconductor poriton of the second electrode, which charge image corresponds to the x-ray image of the object, and has a magnitude inversely proportional to the differential absorption of x-ray photons by the object. Thus, those "islands" of photoconductive material, e.g. "islands" 24*a*, beneath portions of phosphor layer 32 receiving the unattenutated x-ray photons 40, have relatively large amounts of positively-charged holes 52 adjacent the surface thereof, while other islands, e.g. 24*b*, have relatively lesser amounts of charge 54 adjacent the surface thereof responsive to conversion of relatively attenuated x-ray quanta 44*a* in the phosphor layer, and still other photoconductor "islands", e.g. 24*c*, are relatively devoid of charge, responsive to the impingement of highly attenuated x-ray quanta 44*b* in the portions of phosphor layer 32 thereabove.

Figure 2:
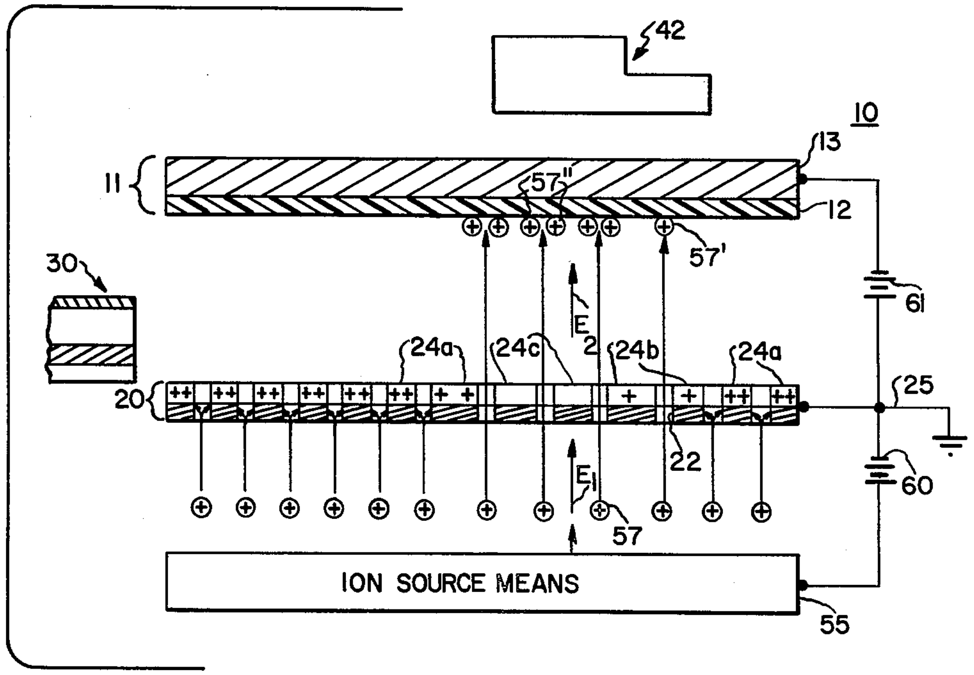
FIG. 2 is a sectional side view of the apparatus of FIG. 1, illustrating the apparatus during completion of a charge image exposure, and prior to development thereof.

Phosphor plaque 30 is now moved away from second electrode 20 (FIG. 2) to uncover the entire surface thereof. An ion source means 55 generates a stream of ions 57, of the same polarity, e.g. positive, as the polarity of charges trapped in the photoconductive "islands" and directs the ions toward at least the apertures in the second electrode and thence towards first electrode 11. A first potential source 60 is coupled between the ion source means and the grounded metallic mesh 21 of the second electrode, to generate an electric field $E_1$, in the volume therebetween, directed toward the second electrode, for accelerating ions 57 toward the apertures 22 in the second electrode. A second potential source 61 is coupled between the grounded second electrode mesh and the conductive layer 13 of first electrode 11, to generate another electric field $E_2$ directed across the gap between the first and second electrodes and towards first electrode 11. Ions 57 are accelerated by the first electric field $E_1$ towards each of mesh apertures 22. Upon entering those of apertures 22 adjacent "islands" 24*a* having relatively great amounts of electrical charge, the fringing fields thereof operate by like-charge interaction to repel the similarly-charged ions 57 to the conductive mesh portions 21, whereupon the ions are conducted through the mesh to ground 25. Accordingly, relatively few ions 57 pass through these interstices of the second electrode adjacent to "islands" of high charge, and relatively few ions are deposited upon the associated portion of that surface of insulative layer 12 facing the second electrode. Ions 57 passing through apertures 22 adjacent photoconductive "islands" **24*b* having lesser amount of electric charge, encounter proportionally weaker fringing fields, whereby proportionately greater amounts of ions pass through the mesh interstices and are accelerated by field $E_2$ to be deposited, as ions 57', upon the free surface of insulator layer 12. Those of ions 57 directed through apertures adjacent photoconductive "islands" 24*c* substantially devoid of charge deposits therein, pass relatively freely through the mesh interstices and are accelerated, in the direction and under the influence of electric field $E_2$, to deposit relatively greater amounts of charge 57" upon the surface of layer 12. The magnitude of the charge image formed upon the insulative sheet is thus inversely proportional to the differential absorption of x-ray quanta by the various regions of the object to be analyzed. However, as the number of charges deposited upon the insulative layer is proportional to the time during which ion sources means 55** is in operation, which time is limited only by the dark decay time of the photoconductive layer, an x-ray exposure of relatively low amplitude can be used to generate a charge pattern of amplitude sufficiently high to be made visible by subsequent application of a toner material and development by xerographic techniques, with relatively high contrast. The relatively high contrast is further achieved by the increase in light quantum efficiency of the photoconductor due to the relatively high ($10^4$ to $10^5$ volts per centimeter) electric field therein during x-ray exposure, resulting in more efficient control of the flow of ions during the time that the ion source means is in operation.

While the present invention has been described with reference to a particular embodiment thereof, many variations and modifications, including reversal of the polarity of potential source 50 (and the subsequent polarity reversal of potential sources 60 and 61) to form an image of negative charges, along with use of an ion source means projecting negative ions, will become apparent to those skilled in the art. It is my intention, therefore, to be limited not by the specific embodiment disclosed herein, but only by the scope of the appending claims.

What is claimed is:

1. In apparatus for photocontrolled ion-flow radiography of the type having: a first electrode supporting an insulative sheet and receiving radiation quanta differentially absorbed by an object to be analyzed; a second electrode spaced from the first electrode in a direction away from the source of radiation and comprising a conductive mesh having a layer of a photoconductor fabricated upon the mesh surface facing the first electrode; means, selectively movable into abutment with a free surface of the photoconductor layer, for converting the radiation quanta to optical photons of wavelength to which the photoconductor responds; and ion source means for projecting charged ions from beyond said second electrode toward said first electrode, the improvement comprising:

a layer of a conductive material substantially transparent to the optical photons emitted from said converting means, said layer interposed between said converting means and said photoconductor layer;

a layer of insulative material substantially transparent to said optical photons, said insulative layer interposed between said conductive, transparent layer and said photoconductor layer;

both said conductive layer and said insulative layer being coupled to said converting means for movement therewith; and potential source means connected between the conductive mesh of said second electrode and the transparent, conductive layer for providing an electric field through said photoconductor during exposure of said phosphor to the differentially absorbed radiation.

2. The improved apparatus for claim 1, wherein said potential source means provides said electric field with a magnitude between about $10^4$ volts per centimeter and about $10^5$ volts per centimeter.

3. The improved apparatus as set forth in claim 2, wherein said photoconductor layer has a thickness on the order of 20 microns and the magnitude of said potential source means is between about 20 and about 200 volts.

4. The improved apparatus as set forth in claim 1, wherein said substantially transparent, conductive layer is formed of a material chosen from the group consisting of indium oxide ($In_2O_3$), tin oxide ($SnO_2$), and tungsten.

5. The improved apparatus as set forth in claim 4, wherein the conductive, substantially transparent layer has a thickness from about 200 to about 1000 Angstroms.

6. The improved apparatus of claim 1, wherein said insulative layer has a thickness of about 1 to about 10 microns.

7. The improved apparatus as set forth in claim 1, wherein said potential source means is connected to produce an electric field directed from said conductive mesh to said conductive layer; said ion source means providing ions of positive polarity.

8. The improved apparatus as set forth in claim 1, wherein said potential source means is connected to produce an electric field directed from said conductive layer to said conductive mesh; said ion source means providing ions of negative polarity.

* * * * *